United States Patent [19]

Seigneurin et al.

[11] 4,034,067
[45] July 5, 1977

[54] HYDROXYCHLORIDES OF ALUMINUM AND METHOD

[75] Inventors: Laurent Seigneurin, Salindres; Michel Brunet, Rousson, both of France

[73] Assignee: Rhone-Poulenc Industries, Paris, France

[22] Filed: May 17, 1976

[21] Appl. No.: 687,019

Related U.S. Application Data

[63] Continuation-in-part of Ser. No. 514,623, Oct. 15, 1974, abandoned.

[30] Foreign Application Priority Data

| Oct. 16, 1973 | France | 73.36846 |
| June 26, 1974 | France | 74.2201 |
| July 2, 1974 | France | 74.22968 |

[52] U.S. Cl. .............................. 423/462; 252/463; 423/466; 423/467; 423/626; 423/629
[51] Int. Cl.² .......................................... C01B 7/00
[58] Field of Search .......... 423/462, 466, 467, 626, 423/629; 252/463

[56] References Cited

UNITED STATES PATENTS

| 2,881,051 | 4/1959 | Pingard | 423/628 |
| 2,915,365 | 12/1959 | Saussol | 423/628 |
| 3,894,144 | 7/1975 | Becher et al. | 423/462 |
| 3,904,741 | 9/1975 | Jones et al. | 423/462 |
| 3,953,584 | 4/1976 | Danner et al. | 423/462 |

FOREIGN PATENTS OR APPLICATIONS

| 924,510 | 4/1963 | United Kingdom |

OTHER PUBLICATIONS

Clay, J. P. et al. "The Catalytic Effect of Anions Upon the Rate of Dissolution of Hydrous Alumina in Acids" J. Am. Chem. Soc. 60(1938) pp. 2384–2390.

Stumpf, H. C. et al. "Thermal Transformations of Aluminas and Alumina Hydrates" Ind. & Eng. Chem. 42(n) July, 1950, pp. 1398–1403.

*Primary Examiner*—Helen M. McCarthy
*Attorney, Agent, or Firm*—McDougall, Hersh & Scott

[57] ABSTRACT

The preparation of a material consisting essentially or largely of aluminum hydroxychlorides having the general formula $Al_2(OH)_xCl_{6-x}$, in which X is a value up to 5 or more and obtained by reacting active alumina, secured by partial dehydration of hydrates of alumina, with hydrochloric acid or aluminum chloride in which the active alumina has a specific surface area of at least 200 m²/g.

7 Claims, No Drawings

HYDROXYCHLORIDES OF ALUMINUM AND METHOD

This is a continuation-in-part of our copending application Ser. No. 514,623, filed Oct. 15, 1974 now abandoned, and entitled

HYDROXYCHLORIDES OF ALUMINIUM AND METHOD

This invention relates to products which are entirely or largely made up of hydroxychlorides of aluminium obtained from active alumina.

Basic inorganic salts of trivalent metals, and more particularly hydroxychlorides of aluminium of the general formula $Al_2(OH)_xCl_{6-x}$, are known to have various applications, especially in the fields of cosmetics, the treatment of water and mud, and the manufacture of catalyst carriers.

The various previously described methods of preparing aluminium hydroxychlorides comprise either making hydrochloric acid or aluminium chloride react with aluminium, or hydrolysing aluminium chloride, or dissolving hydrates or gels of alumina in aluminium chloride or hydrochloric acid.

Some of these methods have obvious economic drawbacks where metallic aluminium is used, while most of the other methods have technical drawbacks. These are due to the variation in the reactivity of the compounds used as the source of aluminium, which may lead to difficulties in reacting on the substance and to inconsistency in the properties of the products obtained.

This invention has for its object a new method of preparing products consisting entirely or chiefly of aluminium hydroxychlorides where X in the formula may be up to and above the value of 5.

The method comprises using, as the chief source of aluminium, hydrates of alumina which have been activated by partial dehydration to less than 2 molecules of combined moles (0.2 $H_2O$) and more particularly hydrates of alumina which have been activated by partial dehydration in a stream of hot gases, and dissolving these hydrates in solutions of hydrochloric acid and/or aluminium chloride. However, more complex products consisting chiefly of aluminium hydroxychlorides may be obtained by adding, to the partially dehydrated alumina, compounds which will provide other anionic, e.g. polyvalent radicals and various other metals, such as alkali and/or alkaline earth metals. Moreover, these more complex products can also be obtained by adding the desired compounds to previously prepared aluminium hydroxychlorides.

Products obtained by partially dehydrating hydrates of alumina, and commonly referred to as active aluminas, are known to be used very widely, particularly in adsorption and in catalysis. It has been found that this activity, due to the specific surface area which may be several hundreds of m2/g, enables the aluminas to be dissolved gradually and evenly in solutions of hydrochloric acid and/or aluminium chloride without the same disadvantages as are encountered with hydrates of alumina, even if freshly prepared; these drawbacks often consist of the fact that gelled products are obtained, and clear solutions of hydroxychlorides can be separated from them only with difficulty.

The previously used term "aluminium chloride" naturally covers various soluble compositions containing chlorine and aluminium, where the ratio of aluminium to chlorine can thus be varied by reaction on the active alumina; the term "aluminium chloride" particularly includes hydroxychlorides of aluminium already obtained from active aluminas.

Active aluminas, according to the invention, may have a specific surface area which varies within broad limits but which must prefereably be fairly high if fairly large X values are desired. Moreover, the aluminas may be used as appropriate, either in powder form or in the form of agglomerated granular substances. The use of the latter may e.g. make the aluminas easier to react on by improving the circulation of liquids between the granules; this is particularly important for large scale manufacture by continuous processes.

Active aluminas, which are particularly suitable, can be obtained by partially dehydrating hydrargillite, particularly by dehydrating the hydrargillite obtained in large quantities by the Bayer process, and by dehydrating various alumina gels to less than 2 moles of combined water. The specific surface areas of the active aluminas thus obtained may vary widely, but for the method of the invention should preferably be over 200 to 500 m2/g and even over 350 m2/g when the active aluminas are made from gels. Such aluminas are in powder form and can be used in the method of the invention either without further treatment or after being crushed to adjust the distribution of grain sizes, or in the form of agglomerated substances, particularly pellets obtained from a rotary granulator.

The reactivity of the active aluminas is such that the temperature of the reaction medium may rise spontaneously and will then encourage the aluminas to dissolve in the solutions of hydrochloric acid and/or aluminium chloride. However, it is sometimes advisable to heat the solutions somewhat, e.g. to temperatures of about 60° to 90° C, and under these conditions, the temperature may rise to over 100° C when the alumina has been added.

The temperature rise is also particularly helpful in dissolving preliminary compounds which provide other anionic radicals and other metals, when the intention is to obtain more complex products than hydroxychlorides of aluminium. In such cases it may be more advantageous to carry out the reactions in an autoclave, which will further facilitate the dissolving of the various substances. The dissolving process is not completed in one operation, and the non-dissolved portion of the active alumina may be brought back into contact with a reacting solution with fresh active alumina added to it, and so on until all the alumina involved has been dissolved.

According to the various operating conditions, it is possible to obtain aluminium hydroxychlorides in which X has variable values, which may more particularly be from 3 to 4, when the aim is to obtain products particularly designed for treating water and mud. Higher values, which may be over 5, are suitable for products designed for the manufacture of catalyst carriers. Values in which X is 3 or more is obtainable when instead of alumina, use is made of partially dehydrated active alumina in accordance with the preferred practice of this invention.

Finally, the products obtained according to the invention, which owing to the method of manufacture consist initially of solutions of various concentrations containing from 100 to 250 grams of alumina $Al_2O_3$ per liter, may equally be put into the form of solid, powdered or granular products, obtained by known methods such as spraying.

Non-restrictive examples will now be given of the preparation of aluminium hydroxychlorides of various compositions, using active aluminas obtained from hydrargillite and from gel treated in streams of hot gases, the aluminas having various specific surface areas and being in powder form. An example is also given is which $SO_4^=$ ions are added to the reacting solution and finally, by way of comparison, an experiment is described in which aluminium hydroxychloride is prepared by hydrochloric reaction on non-activated alumina gel.

EXAMPLE 1

Hydrargillite obtained by the Bayer process is partially dehydrated in a stream of hot gases, to give an active alumina with a specific surface area of 312 m2/g. The alumina is in the form of a powder with the following distribution of grain sizes:

grains < 90μ 84% by weight
grains < 58μ 50% by weight
grains < 29μ 16% by weight.

430 g of the alumina is stirred into a solution, heated to 85° C, of 420 ml of 36% hydrochloric acid in 800 ml of water, the addition of the alumina taking thirty minutes. The temperature rises spontaneously to 103° C. Agitation of the suspension and reflux are maintained at this temperature for 16 hours. Then heating and agitation are terminated, the excess alumina is decanted and the liquid above it drawn off and centrifuged. This gives 0.80 liter of a 1.186 dense solution of aluminium hydroxychloride with an X value of 3.93.

The excess alumina is put back into suspension in 800 ml of water and heated to 85° C. 420 ml of 36% hydrochloric acid is added and the temperature rises to 103° C. Reflux is maintained for 2 hours at this temperature. 225 g of the same active alumina is stirred in, in the course of 5 minutes, and agitation and reflux are continued at this temperature for 22 hours. In the same way as before, the excess alumina is separated from the liquid, which has a volume of 1.05 liter and a density of 1.18. The value of X is 3.53.

EXAMPLE 2

A powdered active alumina is again prepared from hydrargillite emanating from the Bayer process, by partial dehydration in a stream of hot gases but under less severe thermal conditions than those used to obtain the active alumina in the previous example. This alumina has a specific surface area of 282 m2/g and the following distribution of grain sizes:

grains < 90μ 84% by weight
grains < 60μ 50% by weight
grains < 25μ 16% by weight.

248 kg of the alumina is stirred at 60 kg/h into a reactor which is heated to 80° C and which contains a solution made up of 300 liters of water and 300 kg of 36% hydrochloric acid. The temperature rises spontaneously to 105° C. Reflux and agitation are maintained for 10 hours at that temperature. 400 liters of a solution of aluminium hydroxychloride is separated from the remaining alumina in the same way as in the previous examples. The solution has a density of 1.303 and an X value of 3.58.

The undissolved alumina, thus recovered, is put back into suspension in 300 liters of water and heated to 85° C, and 250 liters of 36% hydrochloric acid is added. The temperature rises to 104° C. After the reflux action has been maintained for 2 hours, 120kg of the same active alumina is added in the course of 2 hours. Agitation and reflux are maintained at the temperature for 15 hours, after which the undissolved alumina is separated from 530 liters of a solution of aluminium hydroxychloride with a density of 1.270 and an X value of 3.54.

EXAMPLE 3

Active alumina with a specific surface area of about 300 m2/g, obtained as indicated in example 1, is calcined to reduce that area to 101 m2/g.

430 g of the alumina is introduced with agitation in the course of 10 minutes into a solution comprising 700 ml of water and 420 ml of 36% hydrochloric acid, heated to 90° C. The temperature rises spontaneously to 103° C. Reflux and agitation are maintained at that temperature for 22 hours. In the same way as in the previous examples, the undissolved alumina is then separated from 0.7 liter of a solution of aluminium hydroxychloride with a density of 1.150 and an X value of 1.58.

If the results of these first three examples are compared one can see the effect of the specific surface area of the active aluminas used on the X values of the solutions of aluminium hydroxychloride obtained. In addition, examples 1 and 2 show that the aluminas can be totally dissolved by reusing the insoluble portions in a fresh operation, and that this does not appreciably affect the value of X.

EXAMPLE 4

This example concerns the dissolving of active alumina in aluminium chloride. 126 g of the same active alumina as was used in example 2 is stirred, in the course of 60 minutes, into a reactor heated to 80° C and containing a solution of 216 g of anhydrous aluminium chloride $AlCl_3$ in 800 ml of water. The temperature rises to 103° C. Heating under reflux is maintained for 15 hours. By the same method as before, 0.8 liter of a solution of aluminium hydroxychloride is separated from the undissolved alumina. The solution has a density of 1.235 with an X value of 3.15. This example shows the great reactivity of active aluminas, even in relation to aluminium chloride in solution, and the possibility of thus obtaining aluminium hydroxychlorides with large X values.

EXAMPLE 5

This example concerns a method of obtaining complex products by reaction with a mixture of HCl and $H_2SO_4$.

The reacting liquor is made up of 1526 ml of water, 14 ml of concentrated sulphuric acid and 374 ml of 36% hydrochloric acid. This solution is heated to 75° C and 414 g of the alumina of example 1 is introduced with stirring over 40 minutes. The temperature rises to 102° C. Agitation, heating and reflux are maintained for 20 hours, then the undissolved alumina is separated, as indicated above, from 0.58 liter of a solution of aluminium hydroxychloride. The solution has a density of 1.270, contains 10.1 g/liter of $SO_4$ and has an X value of 3.51.

EXAMPLE 6

A substantially amorphous alumina gel is obtained by neutralising sodium aluminate with nitric acid at pH 8.5, while keeping the temperature below 35° C. The freshly precipitated gel is agitated for 2 hours. It is then filtered, washed and sprayed to reduce it to finely divided form and dried while keeping it in an amorphous state. It is activated by treatment in a stream of hot gases. The resulting alumina is in the form of a white powder with a specific surface area of 375 m2/g; it loses 10% by weight when heated to 1200° C. Its X-ray diffraction diagram indicates an amorphous appearance with some traces of pseudoboehmite.

The following are placed in an agitated 2 liter glass reactor:

-0.333 liter of a 36% solution of HCl
-0.500 liter of purified water (eau permutee).

This is all brought to reflux and 430 g of the alumina obtained as indicated above is added in the course of 30 minutes. After reacting for 7 hours at boiling point (100°-101° C) the reaction medium is cooled and a solution of the following formula is decanted:

$Al_2O_3$ : 376g/l
$Cl_2$ : 131.3 g/l
d : 1.40
pH : 2.7.

The empirical formula of the aluminium hydroxychloride obtained is $Al_2(OH)_5Cl$.

EXAMPLE 7

900 liters of a solution of basic aluminium chloride of the formula $Al_2(OH)_{2.88}Cl_{3.12}$ previously obtained by dissolving active alumina in hydrochloric acid, diluted with 1000 liters of purified water is placed in an agitated reactor and brought to boiling point. The reactor is made of glazed steel with a capacity of 3 m3 and is equipped with a total reflux condensor. 700 kg of active alumina, having a specific surface area of 290 m2/g, obtained by partial dehydration of hydrargillite in a stream of hot gases, is added to the reflux. All the ingredients are left to react for 18 hours at boiling temperature. After cooling and decanting, 1500 liters of a solution of density 1.22 and pH 4.0 is recovered. Each liter of the solution contains 205 g of alumina $Al_2O_3$ and 74.5 of chlorine; this substantially corresponds to the formula $Al_2(OH)_{5.05}Cl_{0.95}$.

EXAMPLE 8

This is a comparative example and concerns the dissolving of an alumina gel in aluminium chloride. An alumina gel is prepared by precipitating a solution of sodium aluminate, containing 230 g/liter of alumina $Al_2O_3$, with 58% nitric acid at pH 8.5 and a temperature of 57° C. The gel obtained is washed, drained and filtered, then left to develop. This gives a product which contains 12.55% by weight of alumina $Al_2O_3$. 1000 ml of a solution cntaining 167 g of aluminium chloride is heated to boiling point in a reactor and 1 kg of the previously prepared gel is gradually stirred in. The heating and reflux action are maintained for 15 hours, after which the liquid obtained is separated as before. It has a density of 1.25 and an X value of 2.74. However, if one tries to continue the reaction instead of separating the liquid, the alumina swells and absorbs the liquid and it becomes impossible to separate the liquid by filtration or centrifuging.

This is an example of the specificity of the behaviour of active aluminas, which enable a series of reactions to be carried out until they are completely dissolved, while at the same time reaching high X values.

We claim:

1. A method for preparing products consisting essentially of aluminum hydroxychlorides in homogeneous solution in which the aluminum hydroxychlorides have the general formula $Al_2(OH)_xCl_{6-x}$, in which X is a value of 3 to more than 5 but less than 6, comprising heating an aqueous solution of activated alumina to a temperature of 60° F to reflux temperature with vigorous agitation in the presence of a compound selected from the group consisting of aluminum chloride, hydrochloric acid and mixtures thereof for reaction to provide said aluminum hydroxychloride in homogeneous solution, the activated alumina consisting of the product of the partial dehydration of hydrates of alumina in a stream of hot gases to less than 2 moles combined water and a specific surface area of at least 200 m²/g.

2. The method of claim 1 in which the active alumina is obtained from hydrargillite or alumina gels.

3. The method of claim 1 in which the active alumina is in powder form.

4. The method of claim 1 in which the active alumina is in grain form.

5. The method as claimed in claim 1 in which compounds containing polyvalent anionic radicals are added to the partially dehydrated alumina reacted with the aluminum chloride or hydrochloric acid in solution.

6. The method as claimed in claim 5 in which the anionic polyvalent radicals are added in the form of compounds of a metal selected from the group consisting of polyvalent metals, alkali and alkaline earth metals.

7. The method as claimed in claim 1 in which $SO_4^=$ ions are added to the reaction medium.

* * * * *

UNITED STATES PATENT OFFICE
CERTIFICATE OF CORRECTION

Patent No. 4,034,067  Dated July 5, 1977

Inventor(s) Laurent Seigneurin and Michel Brunet

It is certified that error appears in the above-identified patent and that said Letters Patent are hereby corrected as shown below:

Column 3, line 54 change "282 m2/g" to "285 m2/g"

Signed and Sealed this

Twenty-seventh Day of September 1977

[SEAL]

Attest:

RUTH C. MASON  
Attesting Officer

LUTRELLE F. PARKER  
Acting Commissioner of Patents and Trademarks